(12) United States Patent
Bodolay (10) Patent No.: US 6,726,612 B1
(45) Date of Patent: Apr. 27, 2004

(54) CONTINUOUS SUPPLY OF PREFORMED RECLOSABLE FASTENERS

(75) Inventor: William A. Bodolay, Lakeland, FL (US)

(73) Assignee: Z-Patch, Inc., Carbondale, IL (US)

( * ) Notice: Subject to any disclaimer, the term of this patent is extended or adjusted under 35 U.S.C. 154(b) by 56 days.

(21) Appl. No.: 09/660,210

(22) Filed: Sep. 12, 2000

Related U.S. Application Data (60) Division of application No. 09/257,560, filed on Feb. 25, 1999, now Pat. No. 6,117,060, which is a continuation-in-part of application No. 09/118,575, filed on Jul. 17, 1998, now Pat. No. 6,098,369.

(51) Int. Cl.[7] .................................................. B31B 1/84
(52) U.S. Cl. ........................ 493/213; 493/344; 493/379
(58) Field of Search ................................... 493/213, 238, 493/379, 344, 380; 53/133.4, 139.2

(56) References Cited

U.S. PATENT DOCUMENTS

| | | | | |
|---|---|---|---|---|
| 4,601,694 A | * | 7/1986 | Ausnit | |
| 5,036,643 A | * | 8/1991 | Bodolay et al. | |
| 5,573,614 A | * | 11/1996 | Tilman et al. | |
| 5,776,045 A | * | 7/1998 | Bodolay et al. | |
| 5,823,933 A | * | 10/1998 | Yeager | |
| 5,951,453 A | * | 9/1999 | Yeager | |
| 6,098,369 A | * | 8/2000 | Bodolay et al. | |
| 6,117,060 A | * | 9/2000 | Bodolay | |

* cited by examiner

*Primary Examiner*—Eugene Kim
(74) *Attorney, Agent, or Firm*—Vedder, Price, Kaufman & Kammholz, P.C.

(57) ABSTRACT

A continuous supply of preformed reclosable fasteners suited for use in combination with an apparatus for attaching a reclosable fastener to a web of flexible material primarily intended for use with a host packaging machine to form a reclosable container. Strips of reclosable fasteners are arranged in side-to-side relation to each other, and the distal ends of each fastener strip are flattened by the application of heat and pressure whereby the distal ends are not only reduced in thickness, but also fused one to the other, thereby resulting in a continuous length of preformed reclosable fasteners. In a preferred form, the continuous length is wound around a core to create a roll of fasteners. This roll is suited for use in combination with an apparatus for attaching reclosable fasteners to a web of flexible material used by a form, fill, seal, and separate machine making reclosable containers.

20 Claims, 8 Drawing Sheets

CONTINUOUS SUPPLY OF PREFORMED RECLOSABLE FASTENERS

This application is a division of application Ser. No. 09/257,560, filed Feb. 25, 1999, now U.S. Pat. No. 6,117,060. This prior application is assigned of record to Lakeland Micro, Inc., a corporation of Florida. This application is a continuation-in-part of application Ser. No. 09/118,575, filed Jul. 17, 1998, now U.S. Pat. No. 6,098,369.

BACKGROUND OF THE INVENTION

1. Field of the Invention

The present invention relates generally to a continuous supply of preformed reclosable fasteners used in an apparatus for attaching a reclosable fastener to a flexible web of material. More particularly, the supply of preformed fasteners of this invention may be operatively attached to a conventional form, fill, seal and separate packaging machine in a manner that enables the packaging machine to produce high quality reclosable packages without interfering with the ordinary operation of the packaging machine, using the apparatus of the above-referenced co-pending application.

2. Description of the Prior Art

Reclosable containers utilizing zipper-type fasteners are well known in the packaging industry and are used for holding, displaying and dispensing a wide variety of products ranging from hardware items to food products intended for human consumption. With the increasing consumer preference for reclosable zipper-type plastic bags, there have been continual efforts to develop packaging machines for producing such reclosable packages. This is especially true at the retail level for the sale of pre-packaged convenience items such as, for example, food products.

As is also well known in the field of flexible packaging, there presently exist numerous machines for automatically forming, filling and sealing materials in flexible containers. As a result of consumer enthusiasm toward reclosable plastic containers, the packaging industry has sought to develop packaging machines for automatically forming, filling and sealing such reclosable containers. For example, U.S. Pat. No. 5,036,643 discloses a form, fill, seal and separate packaging machine with a means to apply a reclosable zipper to a web of material. However, the means for applying the zipper-type closure to the flexible web is incorporated within the packaging machine. Manufacturers currently utilizing conventional packaging machines are often unable to justify the costs involved with replacing existing machines with one such as disclosed in that '643 patent.

It is, therefore, clear that there remains a great need in the art for a suitable apparatus for attaching a zipper-type closure to a flexible material in a fashion that is particularly adapted to cooperate with existing conventional packaging machines, thus eliminating the requirement for total replacement of present-day packaging machines. In addition, such an apparatus should be capable of adjustment in order to accommodate the manufacture of reclosable packages of various sizes and weight content. Furthermore, such an apparatus should operate in a fashion so that it will not significantly affect the ordinary operation and installation of conventional form, fill, seal and separate packaging machines to which the apparatus would be attached.

Just as apparent is the need for a supply of reclosable fasteners suitable for use in such an apparatus. Such a supply must provide fasteners to the apparatus in a manner so that the fasteners may be efficiently and properly attached to permit forming a secure and reliable reclosable package.

SUMMARY OF THE INVENTION

The present invention relates to a continuous supply of preformed reclosable fasteners used in combination with an apparatus for attaching a reclosable zipper-type fastener to a flexible material primarily intended for use with a host form, fill, seal and separate packaging machine. More specifically, the continuous supply of this invention is used in combination with the apparatus of the invention of the above-referenced co-pending application, that apparatus being adapted for use with virtually any conventional host packaging machine without the necessity of major modification or adjustment to the existing machine or its normal manner of operation.

In the present invention, the apparatus used to attach the preformed reclosable fasteners to the web from which the packages are made is operatively attached to the host packaging machine and driven by at least one programmable motor and function controller in cooperative relation with the host machine. The web of flexible material from which the host machine will ultimately form packages is directed along a first path of the apparatus by guide rollers, and a punch, or other such similar cutting device, positioned along the first path of travel makes at least one cut through a predetermined segment of the web to form a removable/rupturable portion of flexible material that will ultimately provide both convenient and tamper-evident access to the reclosable fastener of the finished container. While movement of the web along the first path is driven by the host machine, intermittent movement of the web along the first path is controlled by a web position detector disposed along that first path and operatively connected to the programmable motor and function controller, for detection of the web of flexible material at predetermined intervals. The actual position of the cutting punch along the first path is adjustable dependent upon the size of the finished container to be made by the host machine.

The apparatus further comprises means for guiding the supply of preformed reclosable zipper-type fasteners along a second path of travel through the apparatus by the programmable motor and function controller. Disposed downstream from the primary supply of reclosable fasteners at what may be termed the distal end of the second path of travel is a pusher for engaging an individual one of the fastener strips to index the fasteners along the second path to means for transferring individual fastener strips into juxtaposition with the segment of the flexible material for sealing in overlying relation to the cut made therein.

In the preferred embodiment of the present invention, the supply of reclosable zipper-type fasteners comprises a roll of fasteners, with adjacent ones attached to each other at their respective fused ends such that the sealing strips are disposed in substantially transverse relation to the direction of travel of the second path through the apparatus. Just downstream from the pusher, a separator, preferably defined by a pair of knives, detaches an individual one of the fastener strips from the supply, and the detached strip is placed within a corresponding one of a plurality of strip receivers formed on the surface of a transfer drum. The individual strips are retained within their corresponding strip receiver, and, in the preferred embodiment, the programmable motor intermittently rotates the transfer drum in response to signals received from the function controller so as to dispose one of the strip receivers and the detached strip held therein into juxtaposition with one of the cuts formed in the web of flexible material. Means are provided for releasing the strip from its retainer and, then, for sealing the strip to the flexible web.

The flexible web having reclosable zipper-type fasteners sealed thereto is then passed to the host machine for forming, filling, sealing and separating reclosable containers therefrom.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
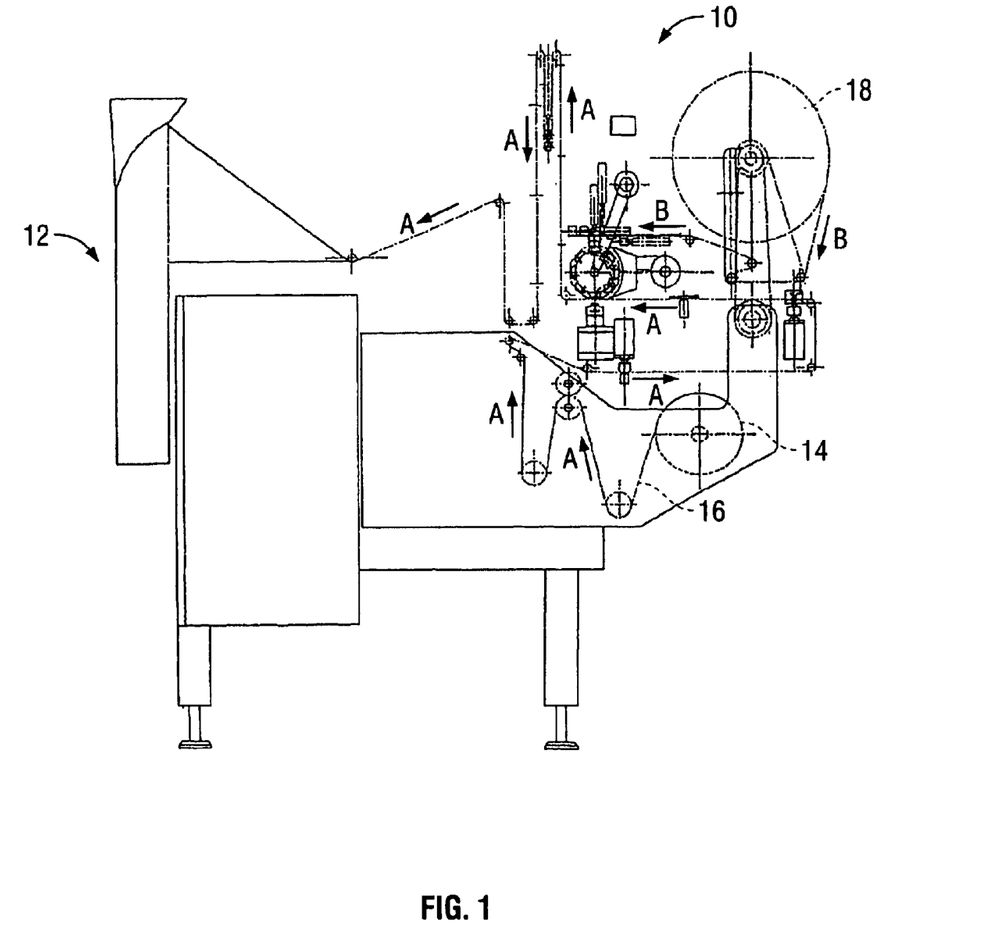
FIG. 1 is a side elevation of a host packaging machine with the apparatus used to apply reclosable fasteners from the supply of this invention operatively attached thereto.
Figure 2:
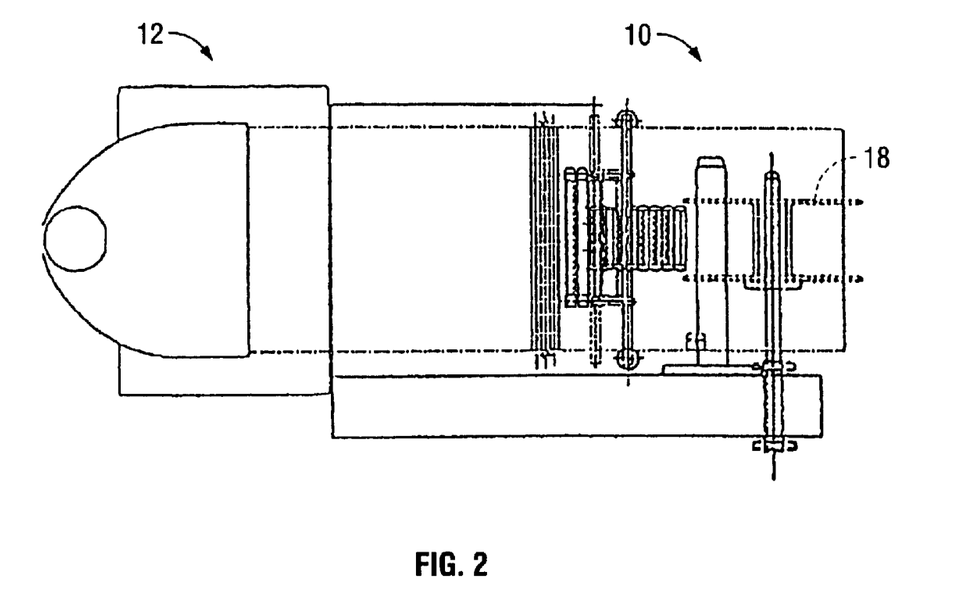
FIG. 2 is a top plan view of the host machine and apparatus shown in the view of FIG. 1.

In the view of FIG. 1, the fastener attaching apparatus is generally indicated as 10, and is shown as being operatively attached to a host form, fill, seal and separate packaging machine generally indicated as 12. While the scope of this invention is not to be limited by the host machine to which it is operatively attached, a vertical form, fill, seal and separate machine is illustrated in the drawing figures as host machine 12. As is well known in the industry, host machine 12 would typically include a supply of flexible material from which containers are to be made. The apparatus 10 utilizes that same supply of flexible material, and the roll of such material is indicated as 14 in the drawing figures. The travel of web 16, indicated by directional arrows A, from roll 14 through apparatus 10, and its treatment by apparatus 10 will be described in greater detail hereinafter.

Still referring to the view of FIG. 1, apparatus 10 further comprises a supply of reclosable zipper-type fasteners, shown in this preferred embodiment as fastener roll 18. It is this roll 18, and more particularly its fastener web 20, which is the subject matter of this invention. Fastener web 20 is guided along a second path, indicated by directional arrows B, for attachment to web 16 as is more fully set forth hereinafter.

It is also to be noted that driving power for apparatus 10 is provided by programmable motor 13 and function controller 11, and that apparatus 10 does comprise a web position detector 22 which is disposed along the first path traveled by web 16 and is operatively connected to controller 11 so as to regulate the travel of both web 16 and fastener web 20. Detector 22 may sense indicia disposed on the surface of web 16 and actually transmits signals to controller 11 to cause the travel along path A and second path B to start and stop dependent upon the size of the finished container being made by host machine 12 so as to ensure proper placement of the reclosable fastener onto web 16. Alternatively, detector 22 may employ other means, such as a roller engaging a surface of web 16, to detect its travel along path A. Referring to the more detailed view of FIG. 3, one may see a preferred location for detector 22 along path A, downstream from roll 14.

Figure 3:
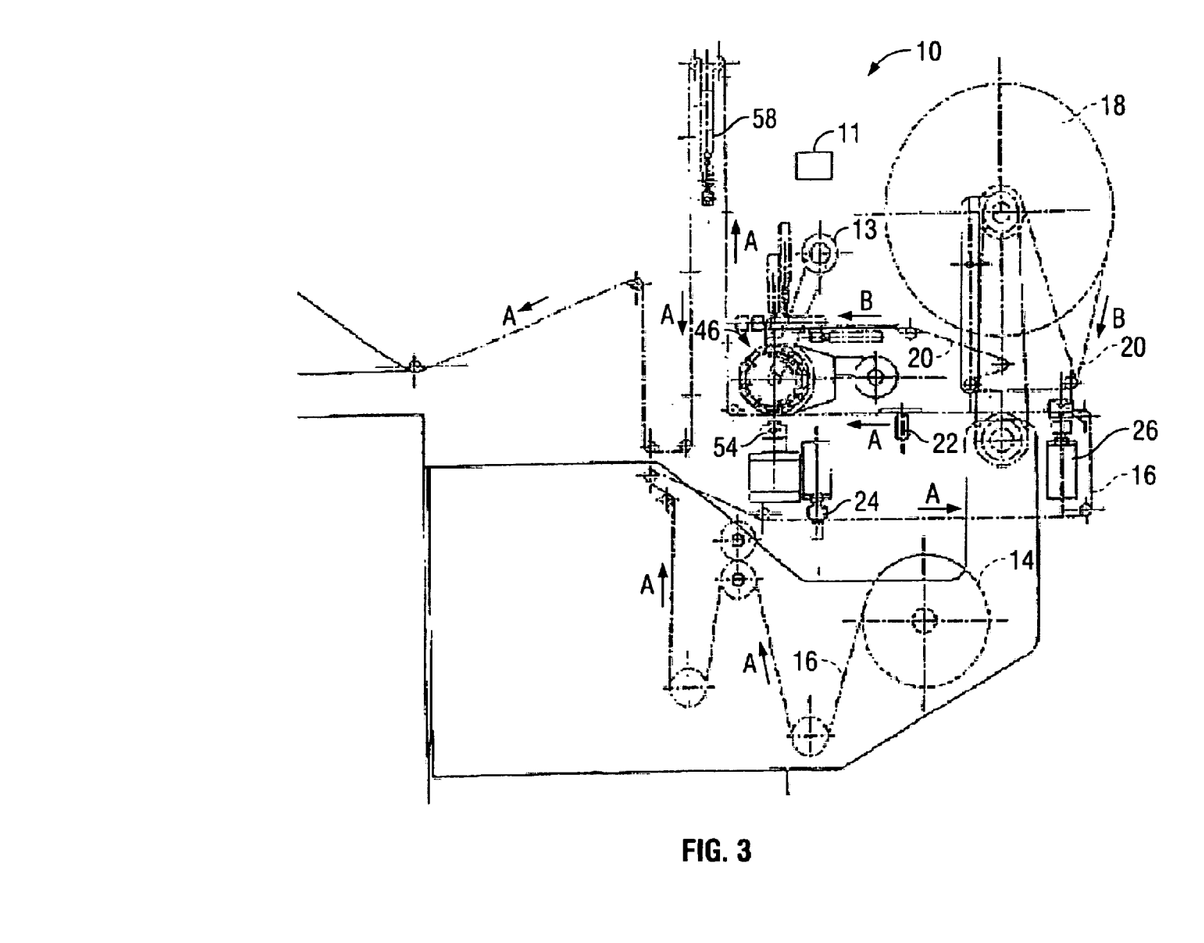
FIG. 3 is an enlarged side elevation of the apparatus as shown in the view of FIG. 1.

Still referring to the view of FIG. 3, when detector 22 senses the presence of an indicia calling for the movement of web 16 to halt, this is accomplished by sending a signal to controller 11 which in turn causes the application of web brake 24. When web 16 is thus stopped, punch 26 is actuated to perforate a segment of web 16, thereby forming a removable/rupturable portion of flexible material in web 16.

Figure 4:
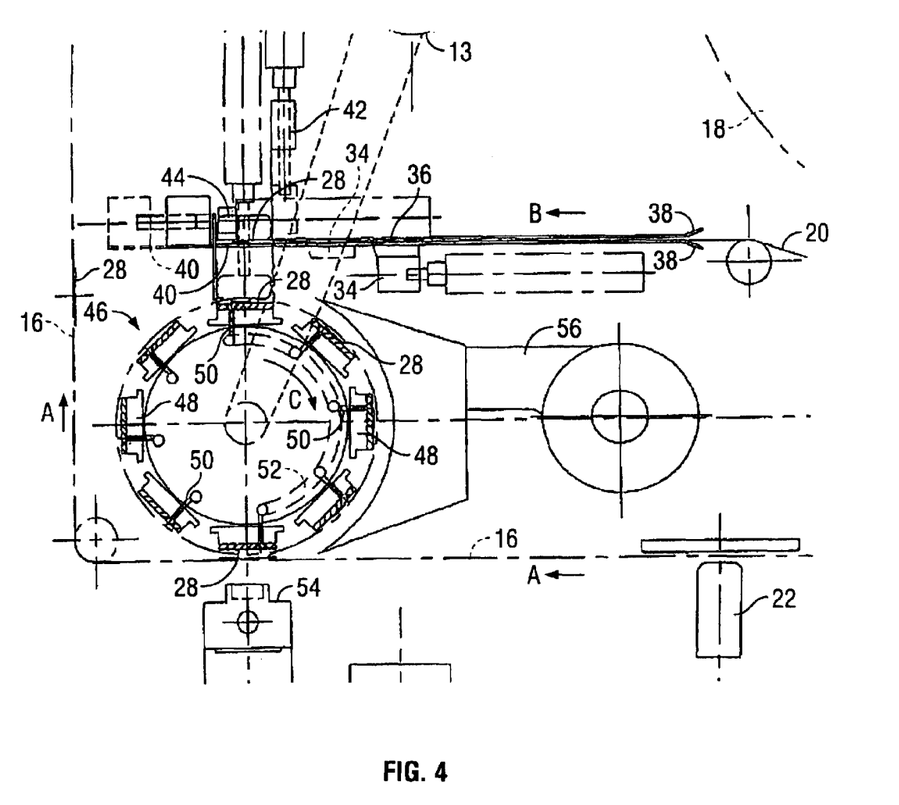
FIG. 4 is a further enlarged side elevation of the apparatus showing the means for guiding the continuous supply of fasteners of this invention and the means for transferring individual ones of the fasteners.
Figure 5:
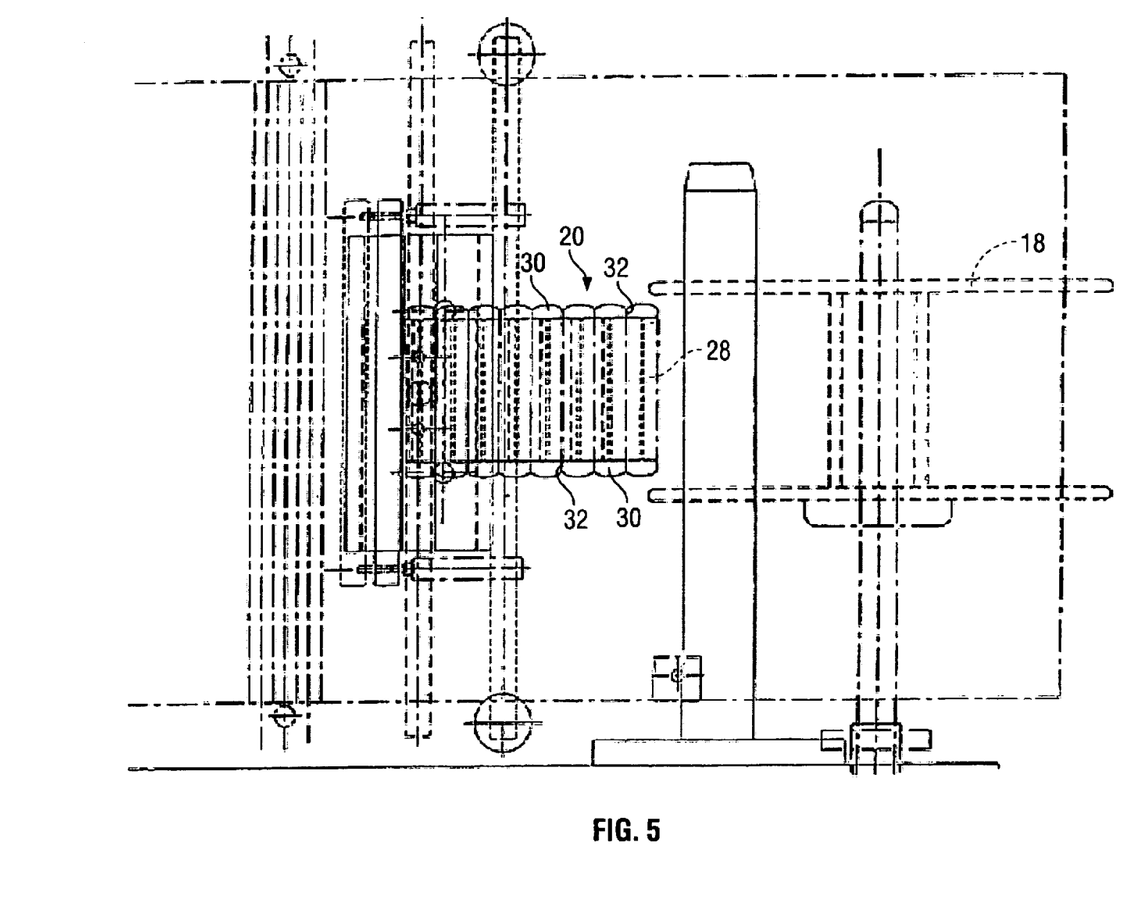
FIG. 5 is an enlarged top plan view of the apparatus as shown in the view of FIG. 2.
Figure 7:
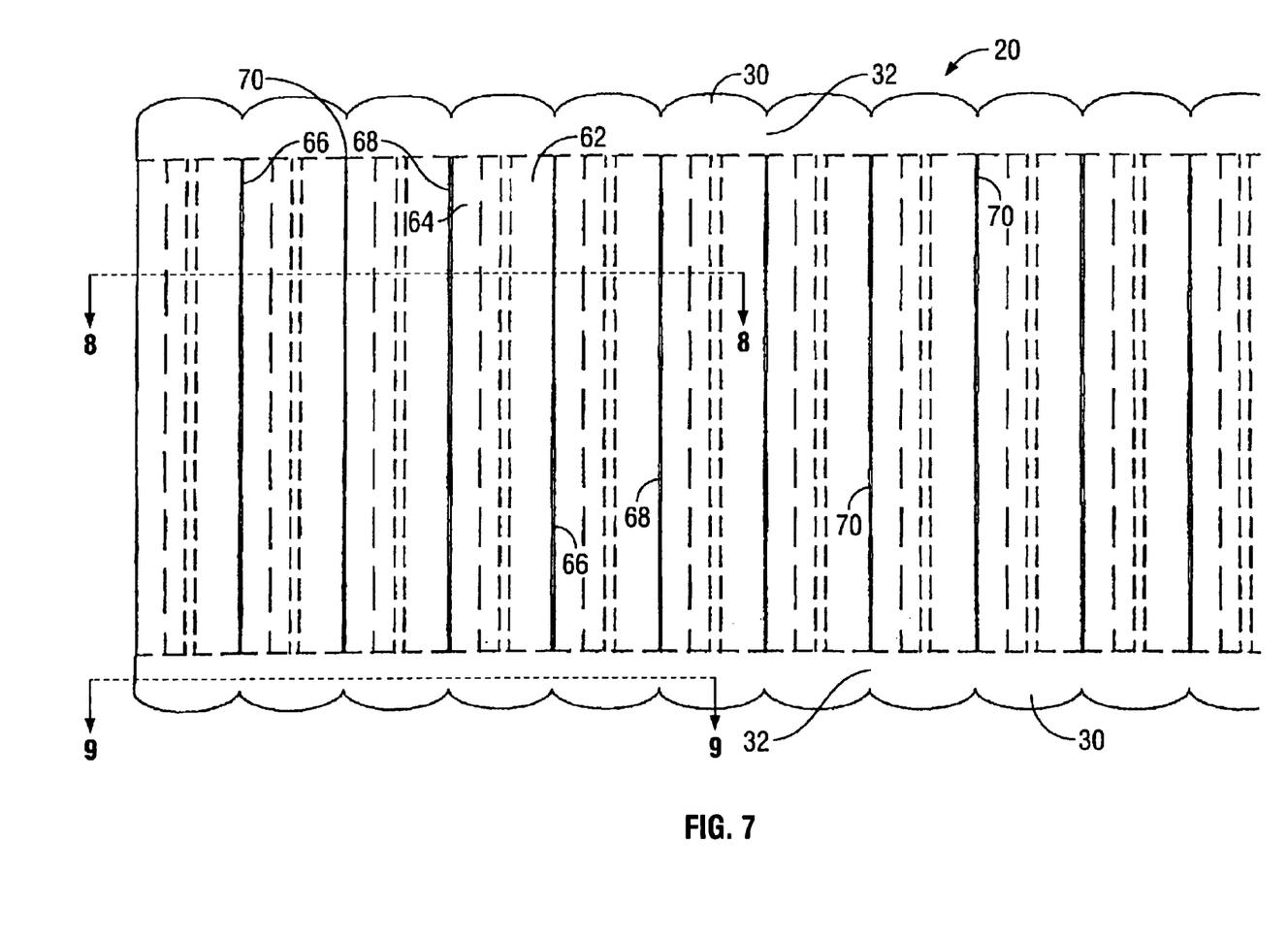
FIG. 7 is a top plan view of the supply shown in the view of FIG. 6.
Figure 9:
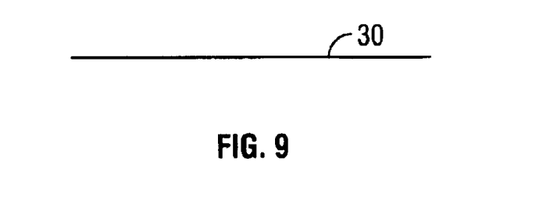
FIG. 9 is a sectional view taken along line 9—9 of FIG. 7.

Attention is now invited to the detailed view of FIGS. 4 and 5 as well as the view of FIG. 3, with particular regard to the elements of apparatus 10 whereby individual reclosable zipper-type fasteners 28 are attached to web 16 in overlying, surrounding relation to the removable/rupturable portion formed by punch 26. Fastener web 20 comprises a plurality of individual zipper-type fasteners 28, each defining a perimeter and having opposed distal ends. Each fastener 28 comprises a pair of mating, reclosable sealing strips, one of which is a male fastener part and the other of which is a female fastener part. The male and female parts are joined to each other and the opposed distal ends are fused (flattened and broadened) as indicated at 30 in the view of FIGS. 5 and 7. It is to be understood that the phrase "fused (flattened and broadened)" is meant to convey that the opposed distal ends are flattened to a thickness that is substantially the same as the thickness of the flanges of the male and female fastener parts, as shown in the sectional view of FIG. 9. This is important to the formation of an acceptable final package wherein the fastener 28 is substantially hermetically sealed to the web 16 from which the package is formed. That is to say, the thickness of the fastener that is actually attached to web 16 is substantially constant around the perimeter of each fastener 28. Adjacent ones of the fasteners 28 are joined together at fused distal ends 30 as by a weld 32 so as to provide a fastener web 20 wherein the reclosable zipper-type fasteners 28 move along second path B with the sealing strips disposed in substantially transverse relation to the direction of travel. Weld 32 may actually be formed when the distal ends are flattened and broadened as indicated at 30 and as seen in FIG. 7. Thus, in the detail view of FIG. 4, one sees an end view of the fastener web 20 that is transverse to second path B.

Figure 6:
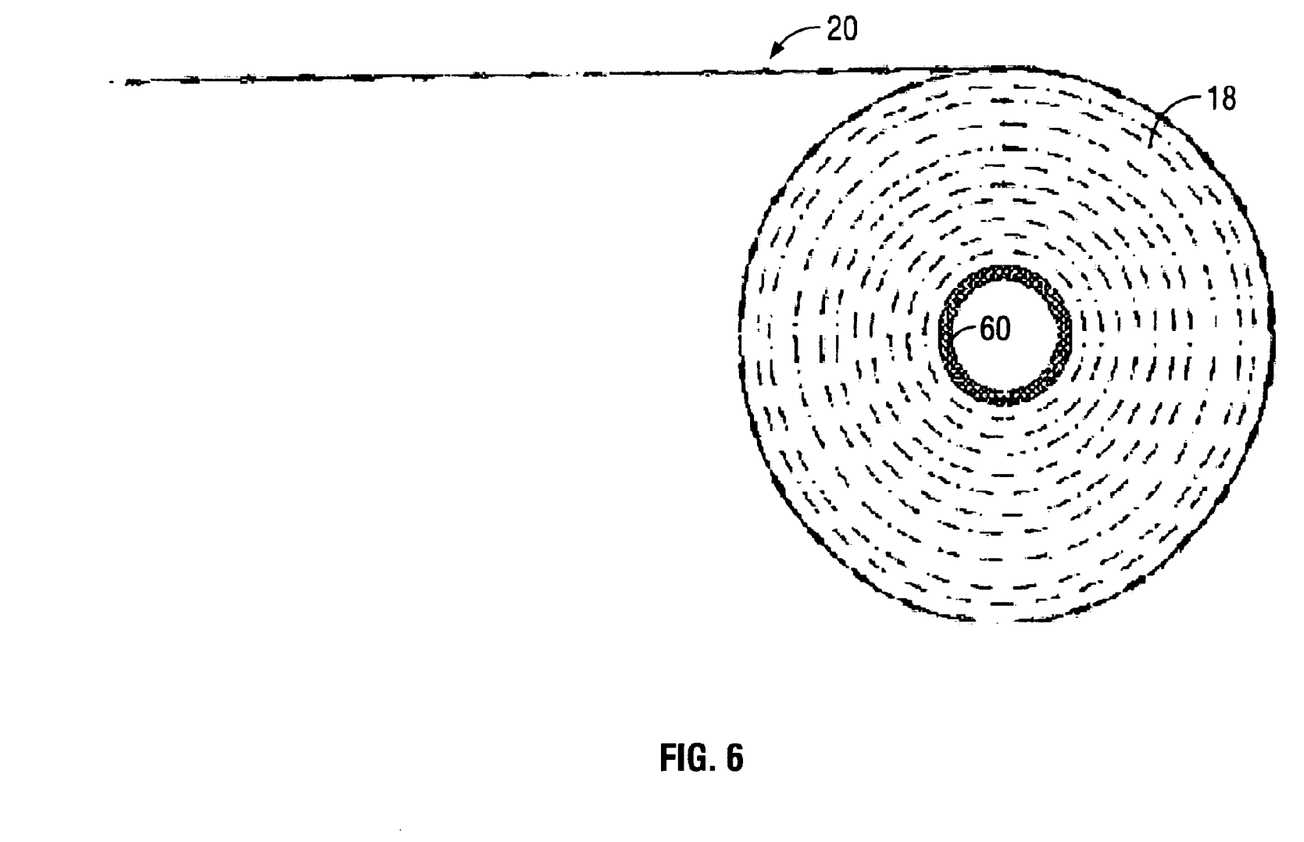
FIG. 6 is an enlarged rear elevation of the supply roll of this invention.
Figure 8:
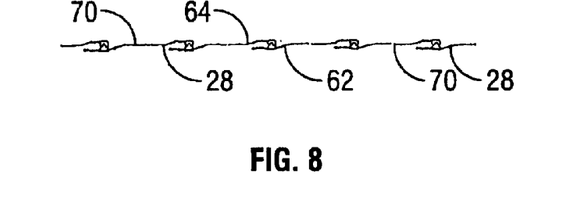
FIG. 8 is a sectional view taken along line 8—8 of FIG. 7.

Referring to the detailed views of FIGS. 6–9, one may see structural details of the continuous supply of this invention. As shown in the view of FIG. 6, fastener roll 18 is wound around a roll core 60 for operative mounting on apparatus 10 as shown in FIG. 1. The fastener web 20 is drawn from roll 18 to travel along second path B, which is essentially parallel to path A just upstream from transfer drum 46. A segment of the web 20 is shown in greater detail in the view of FIG. 7. With specific reference to FIGS. 7 and 8, and as stated above, each of the fasteners 28 comprise a male part 62 and a female part 64, parts 62 and 64 being joined to each other as clearly seen in FIG. 8. The distal ends of each fastener 28 are flattened as indicated by reference numeral 30, and adjacent ones of those flattened ends 30 are fused to each other as indicated by reference numeral 32. Thus, as can be seen in the views of FIGS. 7 and 8, the major longitudinal dimension of each of the fasteners 28, as indicated by sides 66 and 68 of each fastener 28 is free and separate from its adjacent fastener 28 in this preferred embodiment. This "free and separate" relationship between adjacent ones of the fasteners 28 is indicated by reference numeral 70. However, it is to be understood that adjacent ones of the sides 66 and 68 may be attached to each other, continuously or by spot tacking, dependent on actual operating conditions. Such a structure is considered to be within the scope of this invention. Separation of individual fasteners 28 from fastener web 20 is described hereinafter.

Figure 10:
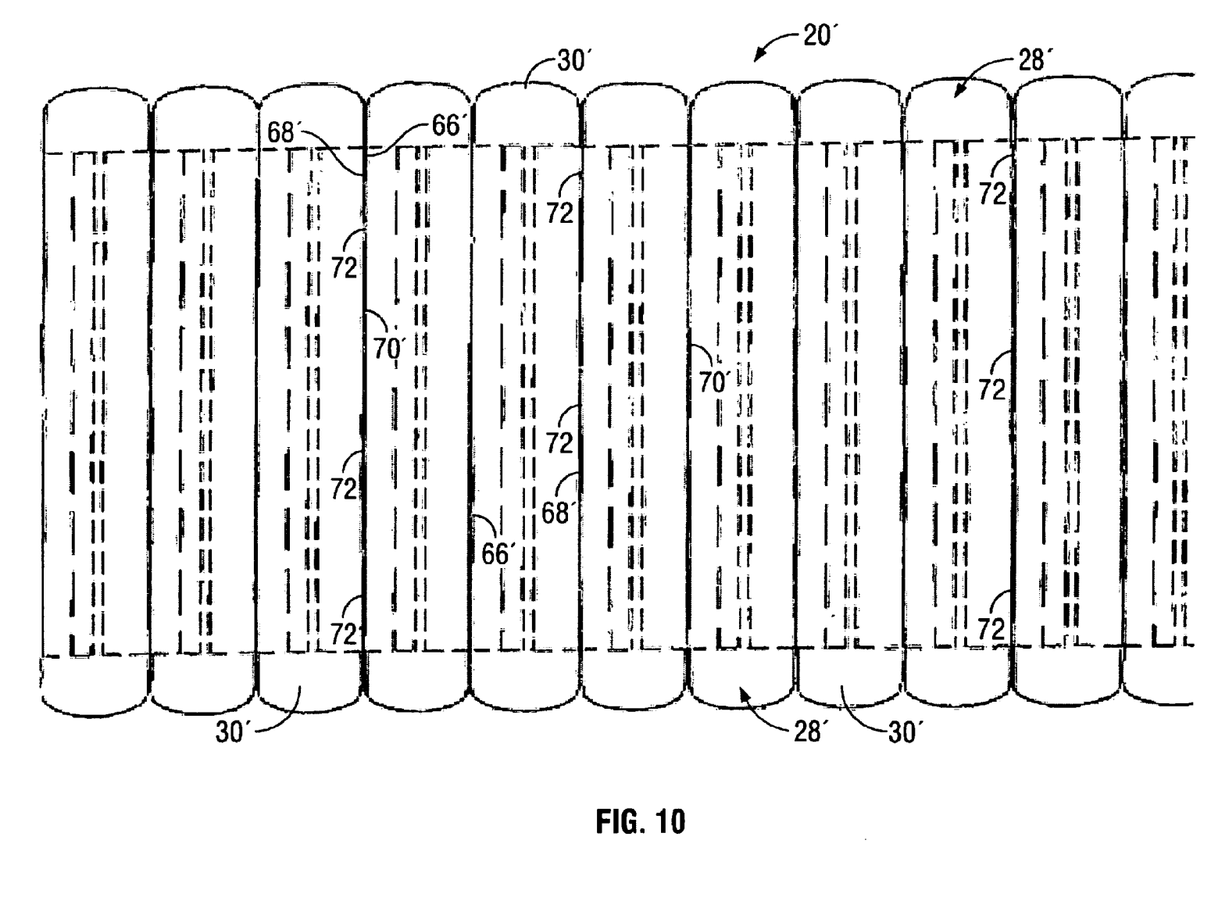
FIG. 10 is a top plan view of a second embodiment of the supply of this invention.

Referring to FIG. 10, one may see a second embodiment for the present invention. Similar structural elements are identified by like reference numerals with the addition of a prime (') mark. Thus, FIG. 10 illustrates a fastener web 20', which would be drawn from roll 18 (not shown). As in the preferred embodiment of FIG. 7, the distal ends of each fastener 28' are pre-flattened as indicated by reference numeral 30', but in this second embodiment flattened ends 30' are not required to be fused together. Rather, individual ones of the fasteners 28' may be joined to an adjacent one of the fasteners 28' as by tack welding virtually anywhere along the longitudinal dimension of the fasteners 28' between adjacent sides 66' and 68', to enhance the lateral stability of the web 20' and the roll 18 when relatively long (e.g., greater than about seven inches) fasteners 28' are used. The joined relationship is indicated in the view of FIG. 10 by tack welds 72. Adjacent sides 66' and 68' are only joined at tack welds 72, leaving those adjacent sides "free and separate" along the longitudinal dimension, as indicated at 70'. Of course, tack welds 72 could also be used in the preferred embodiment of FIG. 7 in addition to the illustrated flattened and fused ends 30.

As is well known in the fastener industry, reclosable fasteners are generally manufactured by extruding the respective male and female parts, joining the two parts, and winding the uncut fastener onto a reel. It is from such a supply of uncut fastener that the continuous supply of this invention is made. Predetermined lengths of fastener are cut from the supply of uncut fastener and arranged in side-to-side relationship to each other. Then, using means for applying heat and pressure, as is known in the art, the distal ends of each fastener are flattened and thereby fused to adjacent flattened ends of the other fasteners to yield a fastener web 20 which may be wound onto a core 60 to provide the fastener roll 18. Of course, in the second embodiment shown in FIG. 10, the distal ends are pre-flattened just as described above, but are not fused to an adjacent flattened end. Rather, the individual fastener strips with distal ends pre-flattened are then aligned as shown in FIG. 10 and tack welded to each other by the application of heat and pressure. These steps and the resulting fastener roll 18 are quite important in order to provide a fastener 28 which may be applied to web 16 in overlying relation to the removable/rupturable portion of web 16 while preserving and ensuring the integrity of the final package. This is particularly important as when food products are being placed in the final package. Absent the step of first flattening the distal ends of each fastener, the material would simply be too heavy and thick to make an hermetic seal onto web 16 without melting or otherwise compromising the integrity of web 16. Obviously, this would result in a totally unsatisfactory final package.

Movement of fastener web 20 along path B is accomplished by pusher 34 which reciprocates as shown in phantom in the view of FIG. 4 in response to signals received from controller 11. Tip 36 of pusher 34 abuts the lip defined by the joining of the male and female fastener parts of each fastener 28, thereby indexing web 20 along second path B.

As fastener web 20 is indexed along second path B through guide 38, the last, or most distal, individual fastener 28 rests on shutter 40 with shutter 40 supporting distal fastener 28, separator 42 is actuated by controller 11 to detach welds 32, thereby separating the distal fastener 28 from fastener web 20. While separator 42 may comprise any suitable device for separating individual fasteners 28 from fastener web 20, in this preferred embodiment, separator 42 comprises a pair of knife edges. Shutter 40 is then retracted as shown in phantom in the view of FIG. 4, and plunger 44 is actuated to transfer the separate distal fastener 28 onto the transfer drum generally indicated as 46. These actions are also controlled by signals received from controller 11.

Transfer drum 46 indexes clockwise, as indicated by directional arrow C in the view of FIG. 4 and is driven by motor 13 which is also operated by signals received from controller 11. Disposed around the perimeter of transfer drum 46 are a plurality of strip receivers 48. Passageways 50 are formed through each of the receivers 48 and, referring to transfer drum 46 as a clock face for the sake of clarity in the view of FIG. 4, it can be seen that each of the passageways 50 are disposed in fluid-communicating relation to a conduit 52 from approximately the 12 o'clock position to slightly after the 5 o'clock position whereby negative pressure may be drawn through conduit 52 and each of the respective passageways 50 so as to retain an individual fastener 28 within the respective strip receiver 48.

As one of the strip receivers indexes to the 6 o'clock position, communication of passageway 50 with conduit 52 is interrupted, thereby releasing fastener 28 onto web 16. More particularly, the fastener 28 is released onto web 16 in registry with the removable/rupturable portion formed through web 16 by punch 26 as previously described. Then, sealing means 54 is actuated by controller 11 to attach fastener 28 in overlying, surrounding relation to the removable/rupturable portion of web 16.

In order to provide for a complete seal of fastener 28 to web 16, this preferred embodiment for apparatus 10 further comprises a heater blower 56 to preheat/condition the fasteners 28 as transfer drum 46 indexes, and this heater blower 56 is operatively disposed from about 1:30 to about 4:30 on the side of transfer drum 46.

Downstream from transfer drum 46 and sealing means 54, web 16, now having individual fasteners 28 attached thereto, continues to move along first path A through festoon 58 for delivery to host machine 12 where a container having a reclosable fastener is formed, filled, sealed and separated. Because apparatus 10 is driven by programmable motor 13 and controller 11 in cooperative relation with the host machine 12, it will be appreciated that the apparatus of the present invention provides to host machine 12 a flexible web of material having reclosable fasteners attached thereto in a non-intrusive manner. More specifically, the addition of apparatus 10 between roll 14 and host machine 12 results in virtually no interference with the normal operation of host machine 12. A substantially constant, uninterrupted supply of web 16 having fasteners 28 attached thereto is provided from festoon 58. Thus, it will be appreciated that this invention provides an improved continuous supply of preformed reclosable fasteners for use in combination with an apparatus for attaching reclosable fasteners to a flexible web of material that is easily adaptable to provide a web of material having reclosable fasteners attached thereto to a conventional form, fill, seal and separate packaging machine, resulting in an overall improved packaging systems capable of producing high quality reclosable packages without the necessity of replacing the entire packaging machine. It is also to be understood that the various elements of apparatus 10, and particularly the programmable motor 13 and controller 11, are easily adjusted in response to particular bag sizes being made by host machine 12. Proper registry of the individual fasteners 28 in overlying relation to the cuts made in web 16 by punch 26 is insured by signals generated from detector 22 sent to and processed by controller 11. Similarly, it is to be understood that the continuous supply of this invention is not to be limited to any singular form of reclosable zipper, nor its use with only the apparatus 10 described herein.

The fastener web 20' of FIG. 10 is used in substantially identical fashion to that just described with regard to the preferred embodiment for web 20. However, the separator 42 would be configured and actuated to sever the tack welds 72, thereby separating a fastener 28' from web 20'.

It will thus be seen that the objects set forth above, among those made apparent from the preceding description, are efficiently attained, and, since certain changes may be made in the above construction and method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A continuous supply of preformed reclosable fasteners, said supply comprising: a plurality of reclosable fasteners, each of said fasteners having a male and female fastener part, and each of said fasteners having opposed distal ends defining a predetermined longitudinal dimension between said ends; said fasteners being disposed in side-to-side relation to each other such that each of said longitudinal dimensions is parallel to another of said longitudinal dimensions; adjacent ones of said distal ends being flattened, and adjacent ones of said fasteners being welded together, thereby providing the continuous supply.

2. A continuous supply of preformed reclosable fasteners in claim 1 wherein said distal ends are flattened as they are welded and fused together.

3. A continuous supply of preformed reclosable fasteners as in claim 2 wherein the longitudinal dimension between said fused ends of each said side-to-side fasteners is free of any connection therebetween.

4. A continuous supply of preformed reclosable fasteners as in claim 1 wherein said continuous supply is wound onto a supply roll.

5. A continuous supply of preformed reclosable fasteners, said supply comprising: a plurality of reclosable fasteners, each of said fasteners having a male and female fastener part, and each of said fasteners having opposed distal ends defining a predetermined longitudinal dimension between said ends; said fasteners being disposed in side-to-side relation to each other such that each of said longitudinal dimensions is parallel to another of said longitudinal dimensions; adjacent fasteners being fused at said distal ends of said longitudinal dimensions, and adjacent ones of said fasteners being welded together, thereby providing the continuous supply.

6. A continuous supply of preformed reclosable fasteners in claim 5 wherein said distal ends are flattened as they are welded and fused together.

7. A continuous supply of preformed reclosable fasteners in claim 6 wherein the longitudinal dimension between said fused ends of each of said side-to-side fasteners is free of any connection therebetween.

8. A continuous supply of preformed reclosable fasteners in claim 5 wherein said continuous supply is wound onto a supply roll.

9. A continuous supply of preformed reclosable fasteners, said supply comprising: a plurality of reclosable fasteners, each of said fasteners having a male and female fastener part, and each of said fasteners having opposed distal ends defining a predetermined longitudinal dimension between said ends; said fasteners being disposed in side-to-side relation to each other such that each of said longitudinal dimensions is parallel to another of said longitudinal dimensions; adjacent fasteners being fused at said distal ends of said longitudinal dimensions, and adjacent ones of said fasteners being welded together, thereby providing the continuous supply.

10. A continuous supply of preformed reclosable fasteners in claim 9 wherein said distal ends are flattened as they are welded and fused together.

11. A continuous supply of preformed reclosable fasteners in claim 9 wherein the longitudinal dimension between said fused ends of each of said side-to-side fasteners is free of any connection therebetween.

12. A continuous supply of preformed reclosable fasteners in claim 8 wherein said continuous supply is wound onto a supply roll.

13. A continuous supply of preformed reclosable fasteners, said supply comprising: at least a first and second reclosable fastener, each of said fasteners having a male and female fastener part, each of said fasteners having opposed first and second distal ends defining a predetermined longitudinal dimension between said ends; wherein said first distal end of the first reclosable fastener is adjacent the first distal end of the second reclosable fastener, and said second distal end of the first reclosable fastener is adjacent the second distal end of the second reclosable fastener; adjacent ones of said distal ends being flattened, and adjacent ones of said fasteners being welded together, thereby providing the continuous supply.

14. A continuous supply of preformed reclosable fasteners in claim 13 wherein said distal ends are flattened as they are welded and fused together.

15. A continuous supply of preformed reclosable fasteners in claim 14 wherein the longitudinal dimension between said fused ends of each of said adjacent fasteners is free of any connection therebetween.

16. A continuous supply of preformed reclosable fasteners in claim 13 wherein said continuous supply is wound onto a supply roll.

17. A continuous supply of preformed reclosable fasteners, said supply comprising: a plurality of reclosable fasteners, each of said fasteners comprised of a pair of mating reclosable sealing strips, one of which is a male fastener part, the other of which is a female fastener part, the male and female parts each having flanges with a thickness, the male and female parts each having opposed distal ends defining a predetermined longitudinal dimension between said ends; each of said fasteners having two sides along the longitudinal dimension, wherein a side of a fastener is continuously adjacent to a side of another fastener along the longitudinal dimension; adjacent ones of said distal ends being flattened and broadened so that the opposed distal ends are flattened to have a thickness that is substantially the same as the thickness of flanges of the male and female fastener parts, and adjacent ones of said fasteners being welded together, thereby providing the continuous supply.

18. A continuous supply of preformed reclosable fasteners in claim 17 wherein said distal ends are flattened and broadened as they are welded and fused together to provide a fastener having a thickness that is substantially constant around its perimeter.

19. A continuous supply of preformed reclosable fasteners in claim 18 wherein the longitudinal dimension between said fused ends of each of said adjacent fasteners is free of any connection therebetween.

20. A continuous supply of preformed reclosable fasteners in claim 17 wherein said continuous supply is wound onto a supply roll.

* * * * *